Figure 1:
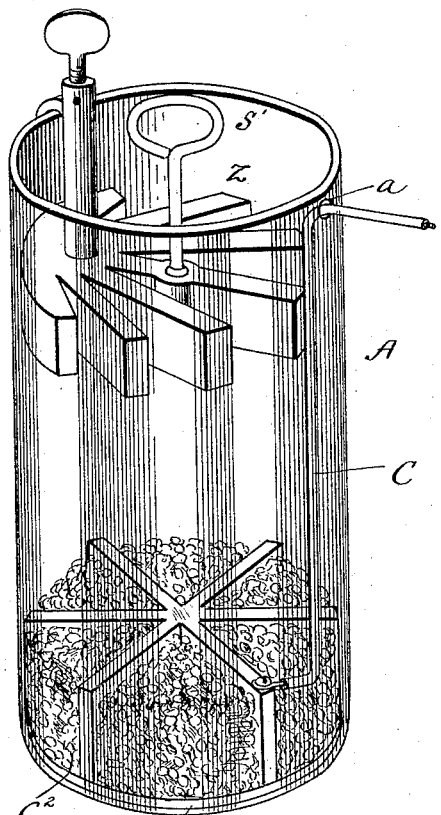

(No Model.)

P. B. DELANY.
ELECTRIC BATTERY.

No. 466,664. Patented Jan. 5, 1892.

WITNESSES:

INVENTOR
Patrick B. Delany
BY
Baldwin, Davidson & Wright
his ATTORNEYS.

UNITED STATES PATENT OFFICE.

PATRICK B. DELANY, OF SOUTH ORANGE, NEW JERSEY.

ELECTRIC BATTERY.

SPECIFICATION forming part of Letters Patent No. 466,664, dated January 5, 1892.

Application filed November 13, 1890. Serial No. 371,266. (No model.)

*To all whom it may concern:*

Be it known that I, PATRICK B. DELANY, a citizen of the United States, residing at South Orange, in the State of New Jersey, have invented a certain new and useful Improvement in Electric Batteries, of which the following is a specification.

The invention specially relates to gravity-batteries; and it consists, first, in an improvement in the ordinary battery-cell, whereby the continuous wire leading from the copper element of the battery is held in a fixed relation vertically to the jar, and, second, in means whereby the zinc "crow-foot" or element may be cleared of the ordinary formations that occur on its bottom without removing the zinc from the cell or disturbing the cell in any way. With the ordinary gravity-battery there is a tendency for the wire attached to the copper plate at the bottom of the jar to lift the plate. This is due to the handling of the wires and to accidental contact with them in attending to other cells. When the copper plate is lifted from the bottom of the cell, the crystals of sulphate of copper become lodged under the plate, and in this way the distance between the copper and zinc elements of the battery is changed, producing a variation in the resistance and action of the cell, and in a group of cells there will therefore be a wide difference in the efficiency of the individual cells.

The purpose of my invention is to prevent this displacement of the copper plate, and to that end I form in or attach to the jar near its upper edge and above the level of the liquid a wire-holder, through which the continuous wire leading from the copper element loosely passes, and is thereby held in fixed relation to the edge or side of the jar, and any ordinary manipulation of the wire or pull upon it will not disturb the copper plate.

The preferred form of carrying out this part of my invention is to form an aperture in the wall of the jar near its upper edge and to lead the wire from the copper element loosely through the aperture.

After a battery has been in use for some time stalactite formations occur on the bottom of the zinc that tend to short-circuit the battery locally and seriously impair its efficiency. With the ordinary battery it is necessary to either lift the zinc from the cell and remove these formations or to endeavor to dislodge them by inserting an instrument beneath the zinc while in the cell; but by the latter plan the zincs can only be partially cleaned, even when considerable trouble is taken. I provide a sweep suitably located with reference to the bottom of the zinc, so that it may be swung or moved across the bottom to dislodge any formation thereon. I prefer to mount the sweep in a bearing in the zinc itself. It may consist of a horizontal arm that lies against or close to the under side of the zinc, and has a handle at the top of the zinc, by means of which it may be moved or turned to cause the arm to sweep the under face of the zinc.

Figure 2:
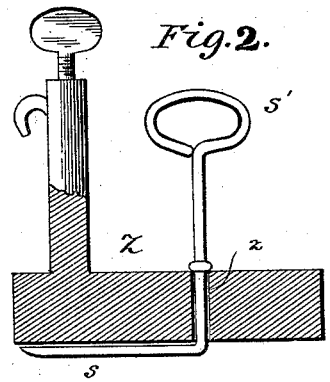

In the accompanying drawings, Figure 1 is a view of a complete cell, and Fig. 2 a detail sectional view of a zinc with my attachment.

In Fig. 1 the glass battery-jar A is formed with an aperture $a$ near its upper edge, and the conductor C, leading from the copper element of the battery, is passed through it.

C′ is the copper plate, and $C^2$ represents the crystals of sulphate of copper lying thereon.

With battery-jars of this character it will be obvious that there is no danger of lifting the copper plate or element from the bottom of the jar. There is, therefore, no disturbance of that element of the battery and no variation of the distance between it and the zinc element. The zinc Z is formed with an aperture $z$ in its central toe or projection, and a sweep is mounted therein. The sweep has a horizontal arm S lying against the under face of the zinc, and a handle S′, by which it may be turned, so that the arm S will dislodge the formations in the bottom of the zinc.

I claim as my invention—

1. In a battery, the combination of the zinc and copper elements, a conductor leading from the copper element, and a jar within which the zinc and copper elements are contained and which is provided with an aperture near its edge, through which the conductor from the copper element passes, for the purpose specified.

2. The combination of a gravity-battery zinc, and a sweep mounted thereon, having a horizontal arm S beneath the zinc and a handle S' above the zinc.

3. The combination of a gravity-battery zinc and a sweep for cleaning the under side of the zinc.

In testimony whereof I have hereunto subscribed my name.

PATRICK B. DELANY.

Witnesses:
FRANK S. OBER,
EDWARD C. DAVIDSON.